(12) United States Patent
Onose et al.

(10) Patent No.: US 9,706,063 B2
(45) Date of Patent: Jul. 11, 2017

(54) INFORMATION PROCESSING APPARATUS AND STORAGE MEDIUM

(71) Applicant: KYOCERA Document Solutions Inc., Osaka (JP)

(72) Inventors: Nao Onose, Osaka (JP); Keiji Sakabe, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/183,623

(22) Filed: Jun. 15, 2016

(65) Prior Publication Data

US 2016/0381236 A1 Dec. 29, 2016

(30) Foreign Application Priority Data

Jun. 29, 2015 (JP) .................................. 2015-129376

(51) Int. Cl.
*G06F 3/12* (2006.01)
*H04N 1/00* (2006.01)

(52) U.S. Cl.
CPC ..... *H04N 1/00228* (2013.01); *H04N 1/00307* (2013.01); *H04N 1/00347* (2013.01); *H04N 2201/0094* (2013.01)

(58) Field of Classification Search
None
See application file for complete search history.

(56) References Cited

U.S. PATENT DOCUMENTS 9,621,750 B2 * 4/2017 Shimamoto ........ H04N 1/00411
2004/0048571 A1 * 3/2004 Kiyose ................... G01C 21/16 455/41.2
2011/0063645 A1 * 3/2011 Sugino .................. G06F 3/1204 358/1.13
2012/0250082 A1 * 10/2012 Mori ..................... G06F 3/1204 358/1.15
2013/0208312 A1 * 8/2013 Morita ................ G06F 3/04883 358/1.15
2014/0211254 A1 * 7/2014 Takeuchi ................ G06F 3/126 358/1.15
2014/0240778 A1 * 8/2014 Itogawa ................ G06F 3/1292 358/1.15
2015/0227329 A1 * 8/2015 Torii ..................... G06F 3/1236 358/1.15

FOREIGN PATENT DOCUMENTS

| JP | 2011096102 A | * | 5/2011 |
| JP | 2013157848 A | | 8/2013 |
| JP | 2013164761 A | | 8/2013 |
| JP | 2014035723 A | | 2/2014 |

* cited by examiner

*Primary Examiner* — Dung Tran
(74) *Attorney, Agent, or Firm* — Studebaker & Brackett PC

(57) ABSTRACT

An information processing apparatus includes a processor and a memory. The memory stores therein an information processing program. When the processor executes the information processing program, the processor operates to: detect an operation performed by a user; determine the posture of the information processing apparatus observed when the operation is performed; and determine one of a plurality of image forming apparatuses to be selected as a destination to which an image forming instruction is transmitted, the image forming apparatus to be selected varying depending on the posture of the information processing apparatus observed when the operation is performed.

16 Claims, 7 Drawing Sheets

INFORMATION PROCESSING APPARATUS AND STORAGE MEDIUM

INCORPORATION BY REFERENCE

The present application claims priority under 35 U.S.C. §119 to Japanese Patent Application No. 2015-129376, filed on Jun. 29, 2015. The contents of this application are incorporated herein by reference in their entirety.

BACKGROUND

The present disclosure relates to an information processing apparatus and a storage medium.

An information processing apparatus (typically, a mobile information terminal such as a smartphone or a tablet personal computer) that is known is configured, in an environment where a plurality of image forming apparatuses (e.g., Multifunction Peripherals; hereinafter, simply "MFPs") are present, so as to be able to output an image forming instruction to an arbitrary one of the MFPs.

A typical mobile information terminal is configured to display, on a screen of a touch panel, directions corresponding to the positions of a plurality of image forming apparatuses. When having detected a flick operation along one of the directions displayed on the screen of the touch panel, the mobile information terminal transmits an image forming instruction to the image forming apparatus corresponding to the one of the directions.

On a screen of a typical mobile information terminal, images representing a plurality of terminals that are present in the surroundings thereof are displayed in a positional relationship reflecting the actual positional relationship thereof while the mobile information terminal is placed at the center. The user selects one of the terminals serving as a communication partner, by flicking the touch panel of the mobile information terminal with his/her finger (by performing a flick operation). When the operation to flick the touch panel with a finger is performed, the mobile information terminal recognizes the direction indicated by the operation and, at the same time, calculates the intensity of the operation (the speed of the flicking movement). A typical mobile information terminal is configured to identify a terminal that is positioned in the surroundings and is positioned away from the mobile information terminal by a distance corresponding to the intensity, as a communication destination terminal to which data is to be transmitted.

SUMMARY

An information processing apparatus according to the present disclosure includes a processor and a memory storing therein an information processing program. When the processor executes the information processing program, the processor operates to (i) detect an operation performed by a user, (ii) determine a posture of the information processing apparatus observed when the operation is performed, and (iii) determine one of a plurality of image forming apparatuses to be selected as a destination to which an image forming instruction is transmitted, the image forming apparatus to be selected varying depending on the posture of the information processing apparatus observed when the operation is performed.

A non-transitory computer-readable storage medium according to the present disclosure stores therein an information processing program to be executed by a computer of an information processing apparatus. The information processing program includes a first program code, a second program code, and a third program code. The first program code causes the computer to detect an operation performed by a user. The second program code causes the computer to determine a posture of the information processing apparatus observed when the operation is performed. The third program code causes the computer to determine one of a plurality of image forming apparatuses to be selected as a destination to which an image forming instruction is transmitted, the image forming apparatus to be selected varying depending on the posture of the information processing apparatus observed when the operation is performed.

DETAILED DESCRIPTION

The following describes embodiments of the present disclosure, with reference to the accompanying drawings.

1. An Outline of an Information Processing System 1

Figure 1:
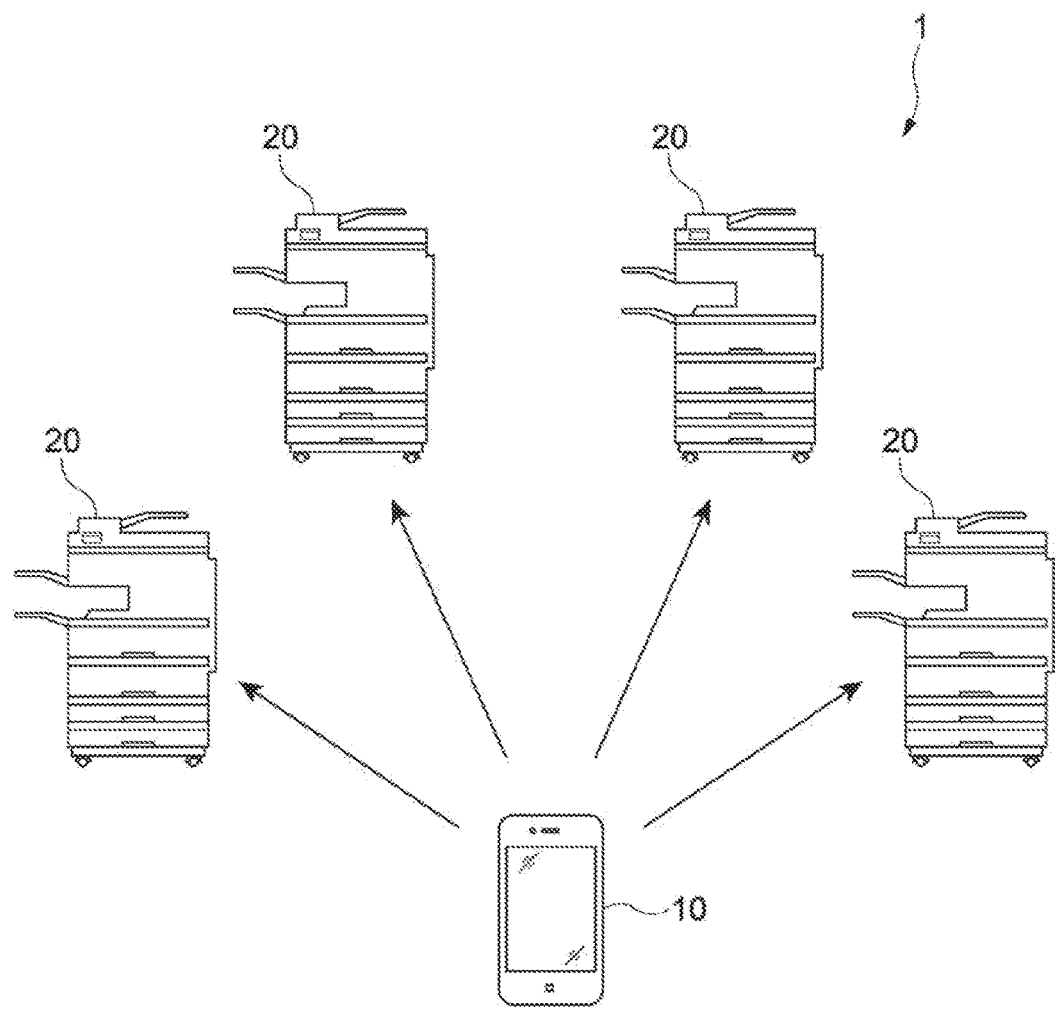
FIG. 1 illustrates an information processing system according to an embodiment of the present disclosure.

FIG. 1 illustrates an information processing system 1 according to an embodiment of the present disclosure.

The information processing system 1 includes an information processing apparatus 10 and one or more image forming apparatuses 20. The information processing apparatus 10 includes a touch panel, is typically realized with a mobile information terminal such as a smartphone, tablet personal computer, or the like, and will hereinafter be referred to as "mobile information terminal 10". For example, the information processing apparatus 10 is in the shape of a thin box and has a front face, a rear face, and four lateral faces. The front face and the rear face are each shaped so as to extend in the longitudinal direction. The image forming apparatuses 20 are typically realized with Multifunction Peripherals (MFPs) and will hereinafter be referred to as "MFPs 20".

2. A Hardware Configuration of the Mobile Information Terminal 10

Figure 2:
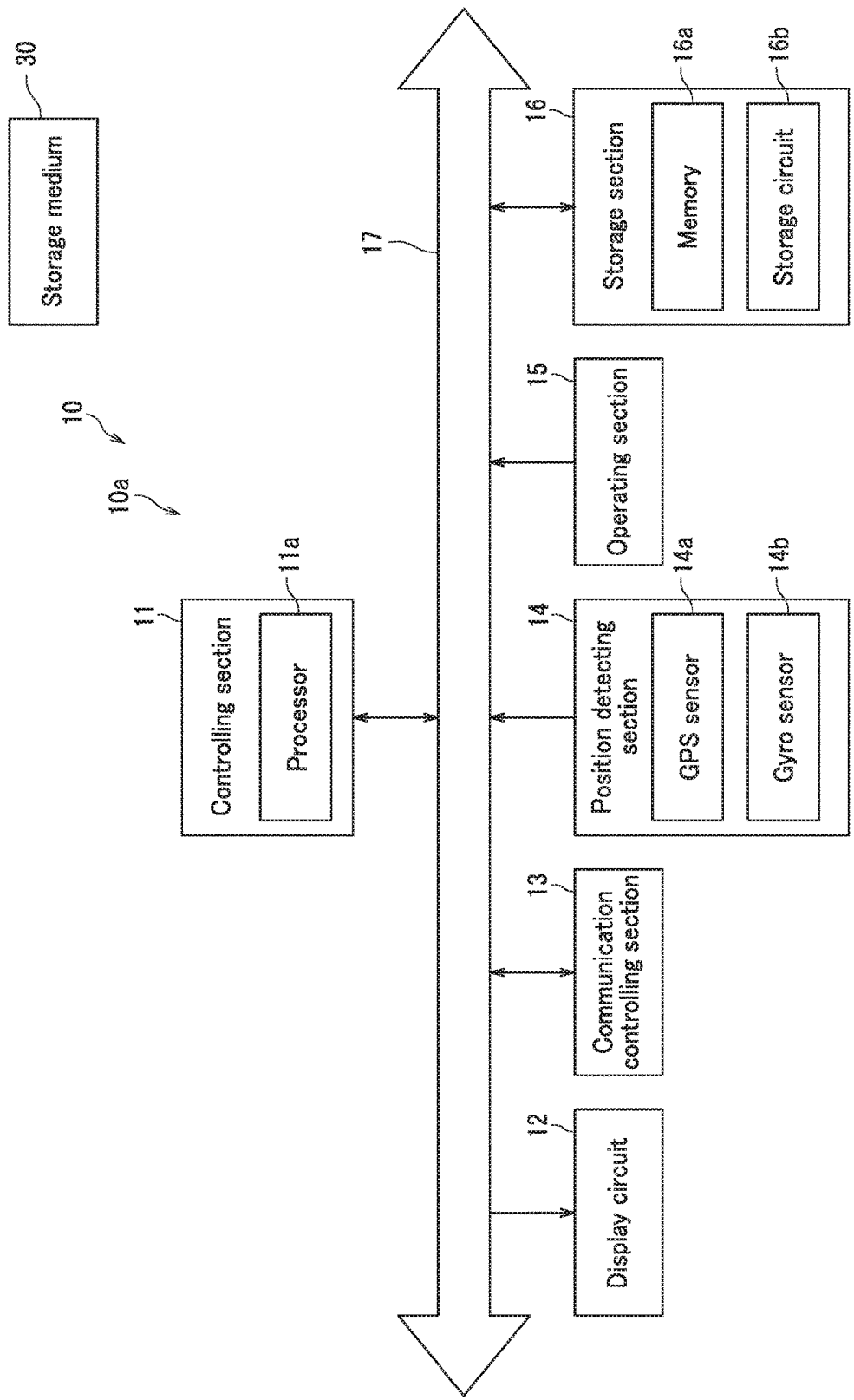
FIG. 2 illustrates a hardware configuration of a mobile information terminal.

FIG. 2 illustrates a hardware configuration of the mobile information terminal 10.

The mobile information terminal 10 includes a controlling section 11. The mobile information terminal 10 further includes a display circuit 12, a communication controlling section 13, a position detecting section 14, an operating section 15, and a storage section 16 each of which is connected to the controlling section 11 via a bus 17. The controlling section 11 and at least a part of the display circuit 12, the communication controlling section 13, the position detecting section 14, the operating section 15, and the storage section 16 structure a computer 10a.

The controlling section 11 is a hardware circuit including a Central Processing Unit (CPU) and the like. The controlling section 11 includes a processor 11a. The controlling section 11 executes a computer program (hereinafter, "program") such as an information processing program or the like that has been loaded into a Random Access Memory (RAM). For example, the information processing program includes a first program code, a second program code, and a third program code. The computer 10a detects an operation performed by a user, by reading the first program code. The computer 10a determines the posture of the information processing apparatus 10 observed when the operation is performed by the user, by reading the second program code. By reading the third program code, the computer 10a variably selects and determines one of the plurality of MFPs 20 as a destination to which an image forming instruction is to be transmitted, the selection varying depending on the posture of the information processing apparatus 10 observed when the operation is performed by the user.

The storage section 16 includes a memory 16a and a storage circuit 16b. More specifically, the storage section 16 includes a semiconductor memory such as a Read-Only Memory (ROM), a RAM, or the like. The ROM stores therein programs executed by the controlling section 11, data, and the like, in a non-transitory manner. Any of the programs stored in the ROM can be loaded into the RAM. Further, the information processing program may be stored in a storage medium 30 such as a Secure Digital (SD) card or a Universal Serial Bus (USB) memory. The controlling section 11 is capable of installing the information processing program from the storage medium 30 into the storage section 16. The storage circuit 16b has a storage area and is also capable of storing therein document data representing a document.

The display circuit 12 includes a Liquid Crystal Display (LCD), an organic Electroluminescence (EL) display, or the like. The display circuit 12 performs arithmetic processing based on information received from the controlling section 11 and displays a generated image signal on a screen.

The operating section 15 is a touch panel including a touch sensor arranged to be positioned over the display circuit 12. The operating section 15 detects an operation (e.g., a flick operation) performed by the user and outputs the detected operation to the controlling section 11.

The communication controlling section 13 is a communication interface such as a Network Interface Card (NIC), a modem, or the like and performs communication with one or more of the MFPs 20 based on a standard such as Ethernet (registered trademark).

The position detecting section 14 includes a Global Positioning System (GPS) sensor 14a, a gyro sensor 14b, and the like. The position detecting section 14 obtains information used for identifying the position and the inclination of the mobile information terminal 10 and outputs the obtained information to the controlling section 11.

3. A Functional Configuration of the Mobile Information Terminal 10

Figure 3:
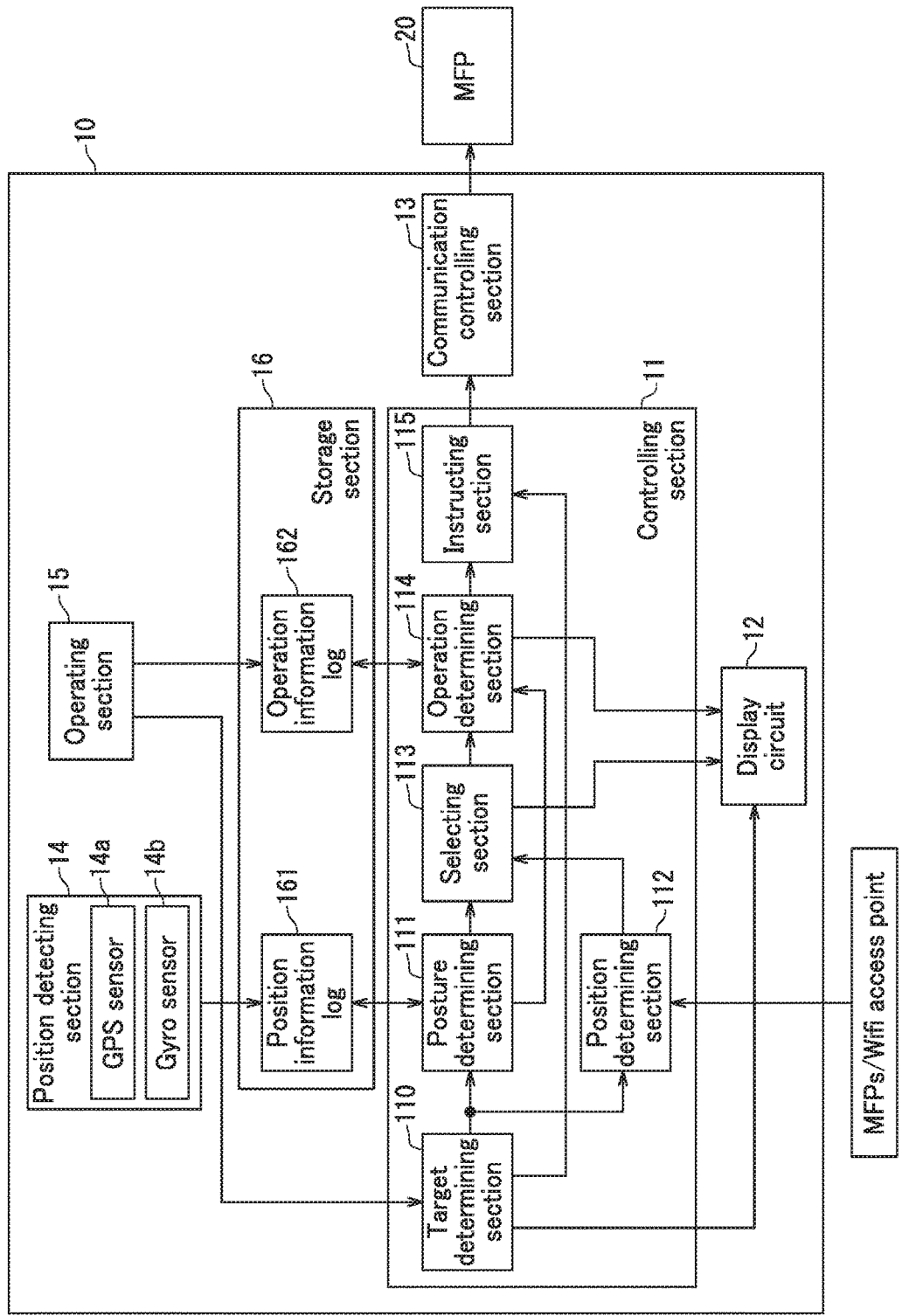
FIG. 3 illustrates a functional configuration of the mobile information terminal.

FIG. 3 illustrates a functional configuration of the mobile information terminal 10.

As a result of executing the information processing program, the controlling section 11 included in the mobile information terminal 10 operates as a target determining section 110, a posture determining section 111, a position determining section 112, a selecting section 113, an operation determining section 114, and an instructing section 115.

The target determining section 110 judges whether there is a designation of a document serving as a target of an image forming process, the designation being made by an operation performed by the user on the operating section 15.

The posture determining section 111 determines the position of the mobile information terminal 10 (i.e., the terminal of its own), with reference to a position information log 161 stored in the storage section 16 and based on GPS information detected by the GPS sensor 14a. The posture determining section 111 further determines the orientation and the posture of the mobile information terminal 10 with reference to the position information log 161 and based on data detected by the gyro sensor 14b.

The position determining section 112 determines the position of each of two or more of the MFPs 20 that are present in a specific distance range from the mobile information terminal 10.

The selecting section 113 selects, based on the orientation of the mobile information terminal 10 and distances from the mobile information terminal 10, one or more of the MFPs 20 serving as candidates for the destination to which the image forming instruction corresponding to document data is to be transmitted.

The operation determining section 114 judges whether a flick operation has been performed, by referring to an operation information log 162 stored in the storage section 16. The operation determining section 114 variably selects and determines one of the plurality of MFPs 20 as the destination to which the image forming instruction is to be transmitted, the selection varying depending on the angle of elevation of the mobile information terminal 10 observed when the flick operation is performed. More specifically, when the angle of elevation of the mobile information terminal 10 observed when the flick operation is performed is equal to or larger than a threshold value, the operation determining section 114 determines one MFP 20 that is positioned closer among the plurality of MFPs 20, as the destination to which the image forming instruction is to be transmitted. Conversely, when the angle of elevation of the mobile information terminal 10 observed when the flick operation is performed is smaller than the threshold value, the operation determining section 114 determines one MFP 20 that is positioned more distant among the plurality of MFPs 20, as the destination to which the image forming instruction is to be transmitted. The angle of elevation of the mobile information terminal 10 denotes the inclination angle of the front face of the mobile information terminal 10 with respect to a horizontal plane. The horizontal plane is a plane orthogonal to a vertical axis. Further, the operation determining section 114 increases an image formation number (the number of copies) every time a specific period of time has elapsed since the flick operation is finished while the mobile information terminal 10 is keeping the same posture as the posture observed when the flick operation was performed (the same angle of elevation as the angle of elevation observed when the flick operation was performed). The image formation number is the number of times (e.g., the number of copies of the printed document) the MFP 20 performs an image forming process on the document serving as the target of the image forming process.

The instructing section 115 transmits the image forming instruction to the MFP 20 determined as above, via the communication controlling section 13.

4. An Operation of the Mobile Information Terminal 10

Figure 4A:
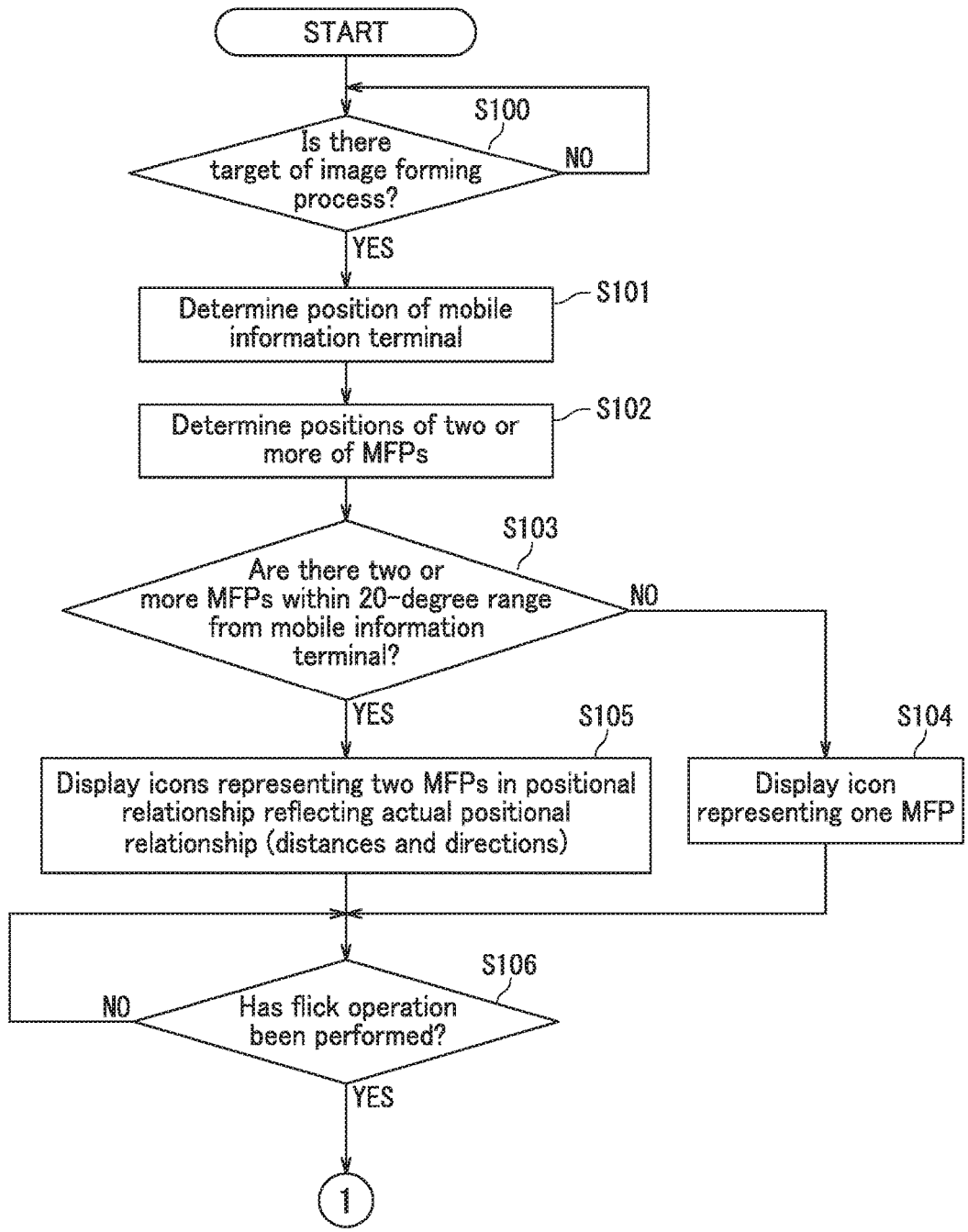
FIGS. 4A and 4B illustrate an operation of the mobile information terminal.
Figure 4B:
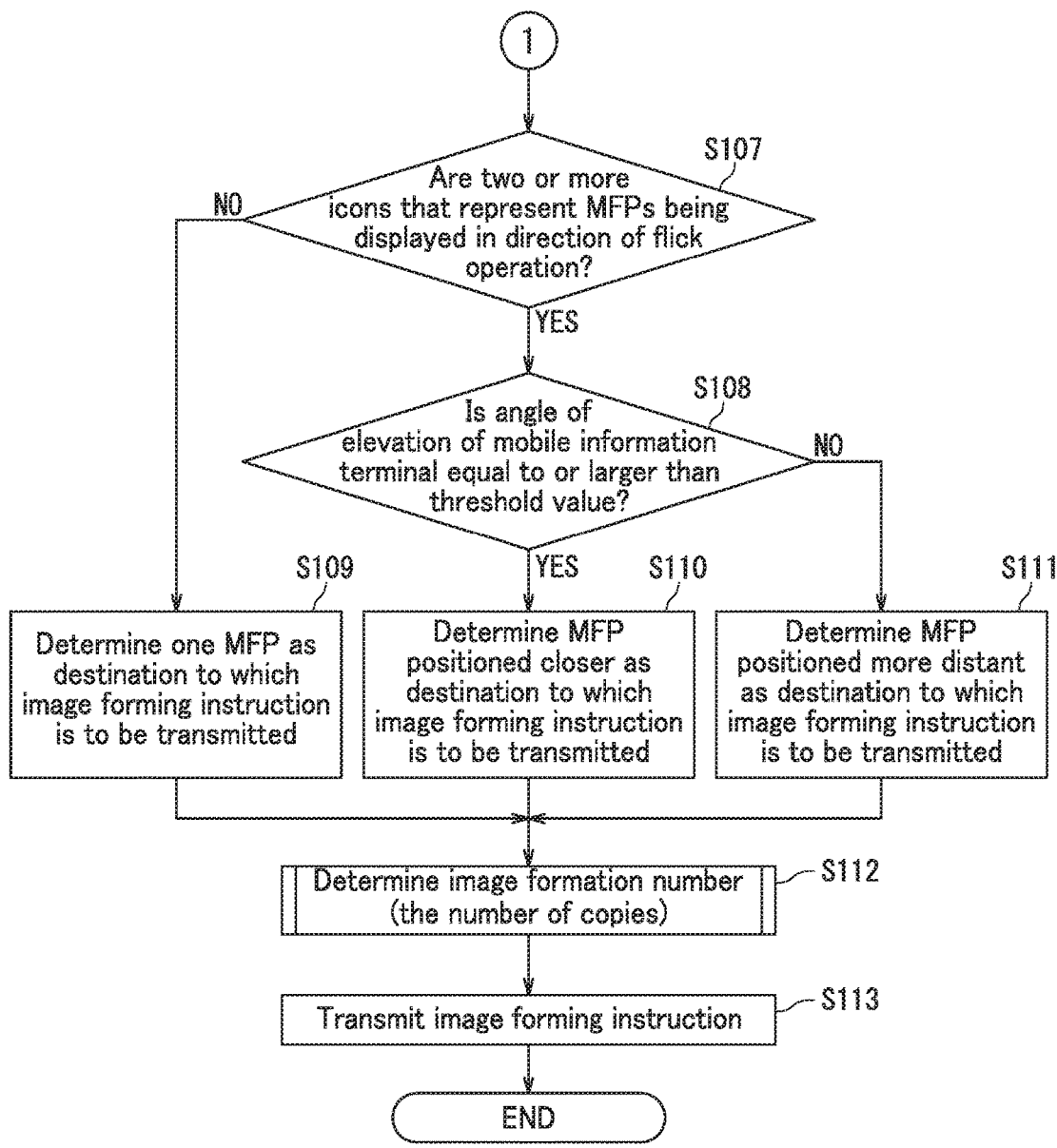

FIGS. 4A and 4B illustrate an operation of the mobile information terminal 10.

In FIG. 4A, the user designates a document serving as a target of an image forming process by operating the operating section 15. The target determining section 110 judges whether a document serving as the target of the image forming process has been designated or not. When it is determined that no document serving as the target of the image forming process has been designated (step S100: No), the target determining section 110 repeatedly performs the process at step S100 until a document serving as the target of the image forming process is designated. On the contrary, when it is determined that a document serving as the target of the image forming process has been designated (step S100: Yes), the target determining section 110 notifies the posture determining section 111 and the position determining section 112 that the target of the image forming process is present. The target determining section 110 supplies the document serving as the target of the image forming process to the instructing section 115. Further, the target determining section 110 controls the display circuit 12 so as to display an image (an icon) (illustrated in FIG. 6 explained later) indicating that the target of the image forming process is present.

Further, the position detecting section 14 writes GPS information detected by the GPS sensor 14a and data detected by the gyro sensor 14b into the storage section 16 as the position information log 161. When having received the notification from the target determining section 110, the posture determining section 111 determines the position of the mobile information terminal 10 (i.e., the terminal of its own), with reference to the position information log 161 and based on the GPS information detected by the GPS sensor 14a (step S101).

Further, the posture determining section 111 determines the orientation of the mobile information terminal 10, with reference to the position information log 161 and based on the data detected by the gyro sensor 14b. In this situation, the "orientation of the mobile information terminal 10" denotes the direction in which a half-line on a horizontal plane extends while using the mobile information terminal 10 as an apex. More specifically, the half-line on the horizontal plane extends while using a specific point within the mobile information terminal 10 (e.g., the center of either the top side or the base side of the screen of the mobile information terminal 10) as the apex. The half-line on the horizontal plane forms the angle of elevation of the mobile information terminal 10, with a center line extending along the longitudinal direction of the screen of the mobile information terminal 10 (i.e., the lengthwise direction for the user viewing the screen). The posture determining section 111 supplies the information about the position and the orientation of the mobile information terminal 10 to the selecting section 113.

The posture determining section 111 further determines the posture of the mobile information terminal 10 with reference to the position information log 161 and based on the data detected by the gyro sensor 14b. In this situation, the "posture of the mobile information terminal 10" specifically denotes the inclination angle (the angle of elevation) of the mobile information terminal 10 with respect to a horizontal plane that is measured while using the lower end (the lower end for the user viewing the screen) of the mobile information terminal 10 as the apex. The lower end denotes the lower end in the vertical axis direction. The posture determining section 111 supplies the information about the calculated angle of elevation of the mobile information terminal 10 (hereinafter, simply "elevation angle information") and the information about the time period during which the angle of elevation is formed (hereinafter, simply "elevation angle period information") to the operation determining section 114. The time period during which the angle of elevation is formed denotes the time period from the time at which the angle of elevation is formed, to the time at which the angle of elevation stops having the same value (the time at which an angle of elevation having a different value is formed).

Further, when having received the notification from the target determining section 110, the position determining section 112 determines the position of each of two or more of the MFPs 20 that are present in the specific distance range from the mobile information terminal 10 (step S102). In one specific example, the position determining section 112 receives GPS information from each of the two or more of the MFPs 20 and identifies the position of each of the two or more of the MFPs 20 based on the received GPS information. In another specific example, the position determining section 112 measures the strength of a radio wave emitted from each of the two or more of the MFPs 20. Further, a plurality of WiFi access points arranged in specific positions also measure the strength of the radio wave emitted from each of the two or more of the MFPs 20. The position determining section 112 receives the information indicating the measured strengths of the radio waves from each of the plurality of WiFi access points. The position determining section 112 identifies the position of each of the two or more of the MFPs 20, based on the strengths of the radio waves measured by the position determining section 112 and the strengths of the radio waves measured by the plurality of WiFi access points. The position determining section 112 supplies the information about the positions of the two or more of the MFPs 20 that are present in the specific distance range centered on the mobile information terminal 10, to the selecting section 113.

The selecting section 113 obtains the information about the position and the orientation of the mobile information terminal 10 from the posture determining section 111. Further, the selecting section 113 obtains the information about the positions of the two or more of the MFPs 20 that are present in the specific distance range centered on the mobile information terminal 10, from the position determining section 112. The selecting section 113 selects one or more MFPs 20 serving as candidates for the destination to which the image forming instruction is to be transmitted, based on the orientation of the mobile information terminal 10 and the distances from the mobile information terminal 10 to the MFPs 20. More specifically, the selecting section 113 determines the number of MFPs 20 that are present within a specific angle range centered on a half-line on a horizontal plane (step S103). The half-line indicates the orientation of the mobile information terminal 10. The half-line indicating the orientation of the mobile information terminal 10 uses a specific point within the mobile information terminal 10 (e.g., the center of either the top side or the base side of the screen of the mobile information terminal 10) as the starting point thereof. The specific angle range on the horizontal plane may be, for example, the range of ±10 degrees (a total of 20 degrees) from the half-line. When the number of MFPs 20 is one (step S103: No), the selecting section 113 controls the display circuit 12 so as to display an image (an icon) representing the MFP 20 (step S104). In contrast, when the number of MFPs 20 is two or more (step S103: Yes), the selecting section 113 selects two of the MFPs 20 that are positioned closer to the mobile information terminal 10 among the two or more of the MFPs 20. The selecting section 113 controls the display circuit 12 so as to display icons (illustrated in FIG. 6 explained later) representing the two selected MFPs 20 in a positional relationship reflecting the actual positional relationship thereof (the distances and the directions thereof) (step S105). The icons representing the MFPs 20 correspond to the "apparatus icons". When the number of MFPs 20 is two, the selecting section 113 controls the display circuit 12 so as to display the icons representing the two MFPs 20 in the positional relationship reflecting the actual positional relationship thereof (the distances and the directions thereof) (step S105). The selecting section 113 notifies the operation determining section 114 of coordinate information on the screen for the icons representing the MFPs 20. At step S105, the selecting section 113 may further control the display circuit 12 so as to display an icon (illustrated in FIG. 6 explained later) representing the document serving as a target of the image forming process. The icon representing the document corresponds to the "document icon". In that situation, the selecting section 113 notifies the operation determining section 114 of coordinate information on the screen for the icons representing the MFPs 20 and the document.

Further, the operating section 15 detects an operation performed by the user on the touch panel and writes information about the detected operation into the storage section 16 as an operation information log 162. In this situation, when the touch panel uses a capacitive sensing method, the "information about the detected operation" includes coordinate information and time information related to a capacitance change that occurred, as well as an amount of the capacitance change, and the like. The operation determining section 114 determines one MFP 20 to which the image forming instruction is to be transmitted from among the one or more MFPs 20 serving as the candidates for the destination, based on the operation performed by the user, the positional arrangements of the apparatus icons (the coordinate information on the screen), and the posture of the mobile information terminal 10. More specifically, the operation determining section 114 judges whether a flick operation has been performed by referring to the operation information log 162 (step S106). When it is determined that no flick operation has been detected (step S106: No), the operation determining section 114 repeatedly performs the process at step S106 until a flick operation is detected. On the contrary, when it is determined that a flick operation has been detected (step S106: Yes), the operation determining section 114 determines the direction of the flick operation based on pieces of coordinate information (e.g., at least coordinate information of a starting point and coordinate information of an ending point) with which capacitance changes have occurred. Subsequently, the operation determining section 114 judges whether two or more icons representing MFPs 20 are displayed in the direction of the flick operation on the screen, based on the coordinate information on the screen for the icons representing the MFPs 20 that has been provided by the selecting section 113 (step S107 illustrated in FIG. 4B). In this situation, the operation determining section 114 may judge whether two or more icons representing MFPs 20 are displayed in a specific range angle on the screen centered on the direction of the flick operation (e.g., either a range of ±10 degrees (a total of 20 degrees) from the direction of the flick operation or the same angle as the specific angle used for the determining process at step S103). In an example, the operation determining section 114 may perform the judging process at step S107 only when the coordinate information of the starting point of the flick operation indicates the coordinates of the icon (illustrated in FIG. 6 explained later) representing the document serving as a target of the image forming process. When it is determined that only one icon representing an MFP 20 is displayed in the direction of the flick operation on the screen (step S107: No), the operation determining section 114 determines the MFP 20 represented by the icon as the destination to which the image forming instruction is to be transmitted (step S109). On the contrary, when it is determined that two icons representing MFPs 20 are displayed in the direction of the flick operation on the screen (step S107: Yes), the operation determining section 114 determines the angle of elevation of the mobile information terminal 10 observed when the flick operation is performed, based on the elevation angle information and the elevation angle period information obtained from the posture determining section 111 (step S108). When the angle of elevation of the mobile information terminal 10 observed when the flick operation is performed is equal to or larger than the threshold value (closer to the vertical angle) (step S108: Yes), the operation determining section 114 determines the MFP 20 that is positioned closer to the mobile information terminal 10 as the destination to which the image forming instruction is to be transmitted (step S110). On the contrary, when the angle of elevation of the mobile information terminal 10 observed when the flick operation is performed is smaller than the threshold value (closer to a horizontal line) (step S108: No), the operation determining section 114 determines the MFP 20 that is positioned more distant from the mobile information terminal 10 as the destination to which the image forming instruction is to be transmitted (step S111). In an example, the threshold value for the angle of elevation may be set in the range approximately from +20 to +30 degrees. After that, the operation determining section 114 determines the image formation number (the number of copies) (step S112).

Figure 5:
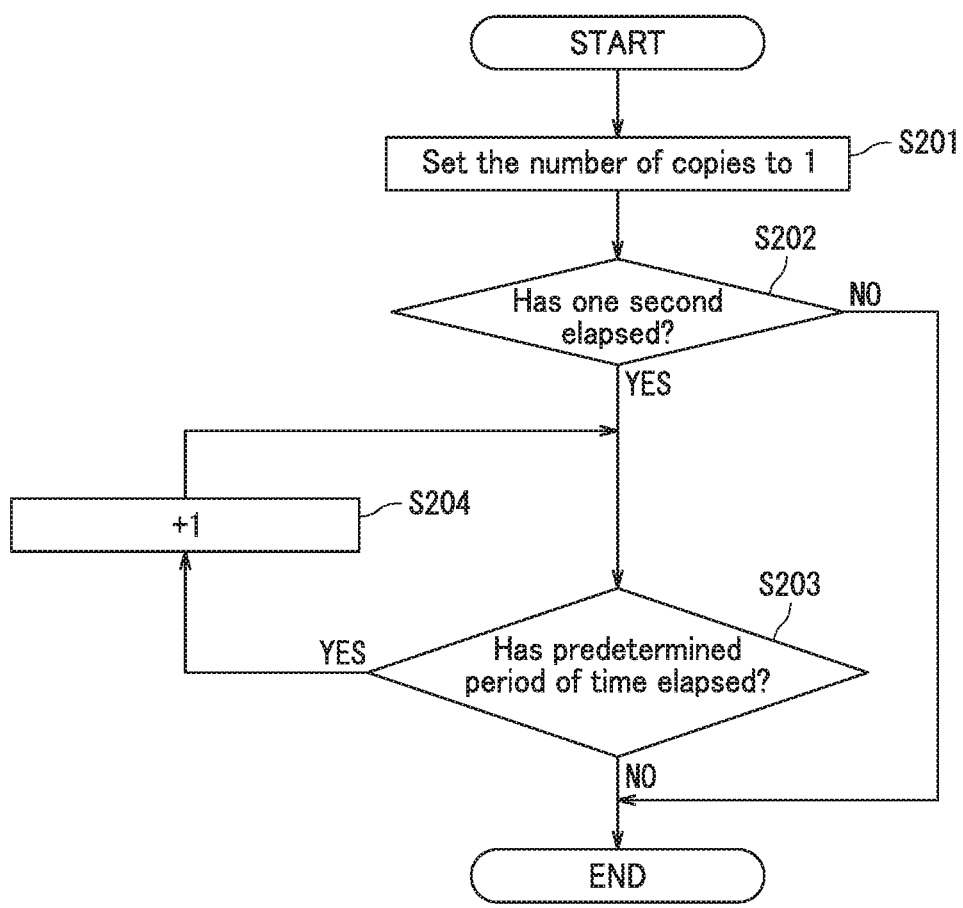
FIG. 5 illustrates an operation to determine an image formation number (the number of copies)

FIG. 5 illustrates an operation to determine the image formation number (the number of copies).

Based on the elevation angle information and the elevation angle period information obtained from the posture determining section 111, the operation determining section 114 judges whether a specific period of time (e.g., one second) has elapsed since the flick operation is finished while the mobile information terminal 10 is keeping the same posture as the posture observed when the flick operation was performed (the same angle of elevation as the angle of elevation observed when the flick operation was performed) (step S202). When it is determined that the time period during which the mobile information terminal 10 has kept the same angle of elevation as the angle of elevation observed when the flick operation was performed is shorter than one second (step S202: No), the operation determining section 114 determines that the number of copies is equal to a default value (typically one copy; step S201). On the contrary, when it is determined one second has elapsed while the mobile information terminal 10 is keeping the same angle of elevation as the angle of elevation observed when the flick operation was performed (step S202: Yes), the operation determining section 114 increases the number of copies by one, every time a specific period of time (e.g., 0.3 seconds) has elapsed (step S203: Yes) after the one second had elapsed, as long as the mobile information terminal 10 is keeping the same angle of elevation as the angle of elevation observed when the flick operation was performed (step S204), so as to determine the final number of copies (step S203: No). For example, when it is determined that the mobile information terminal 10 has kept the same angle of elevation as the angle of elevation observed when the flick operation was performed for 1.6 seconds (=1 second+0.3 seconds×2), the operation determining section 114 determines that the number of copies is equal to three. The operation determining section 114 notifies the instructing section 115 of the MFP 20 determined (steps S109 to S111) as the destination to which the image forming instruction is to be transmitted and the determined number of copies (steps S202 to S204). Further, the operation determining section 114 controls the display circuit 12 so as to display the number of copies before the determining process (being increased) and the determined number of copies (illustrated in FIG. 6 explained later).

Figure 6:
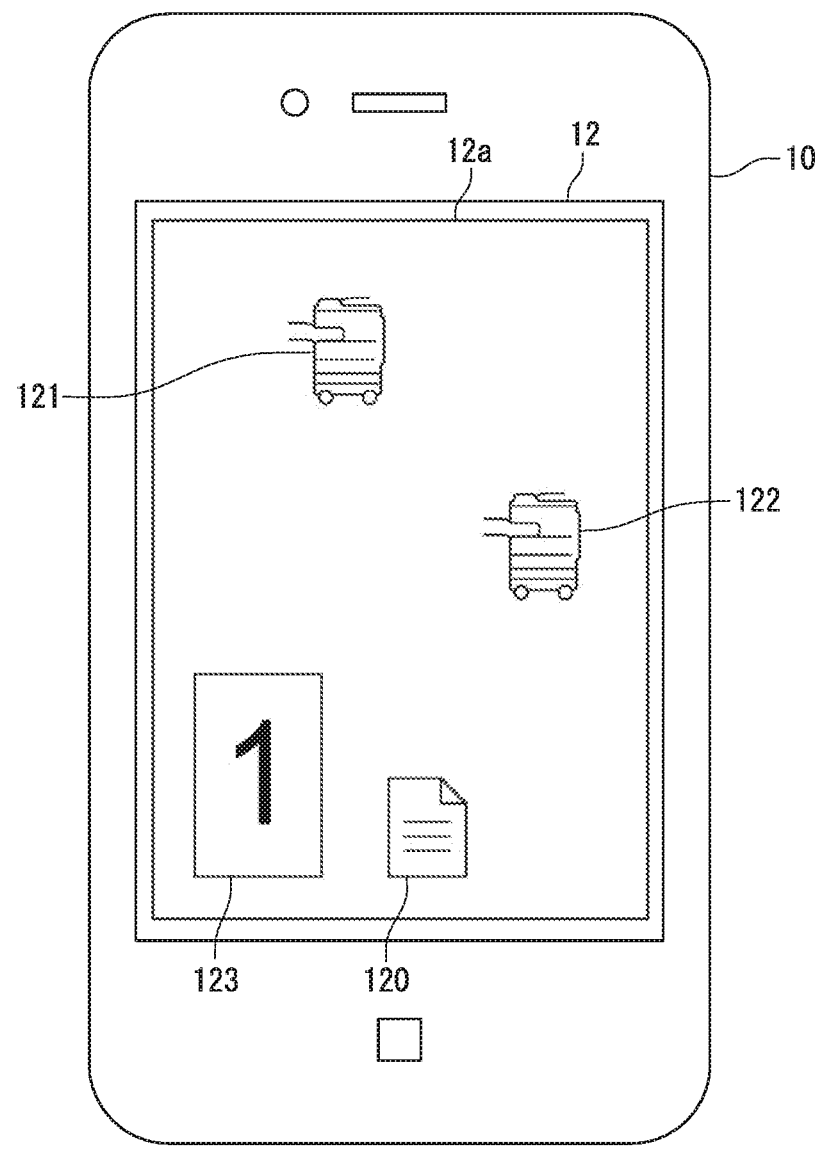
FIG. 6 illustrates an example of a screen displayed by a display circuit.

FIG. 6 is a drawing of an example of a screen 12a displayed by the display circuit 12.

Every time the operation determining section 114 increases the number of copies, the display circuit 12 displays the number of copies after the increase, together with the icons representing the MFPs 20. More specifically, on the screen 12a of the display circuit 12, an icon 120 representing the document serving as a target of the image forming process (step S110) is displayed. Further, icons 121 and 122 representing the MFPs 20 (two MFPs in the example in FIG. 6) determined by the selecting section 113 are displayed (step S105) in the positional relationship reflecting the actual positional relationship (the distances and the directions thereof). Further, a numerical value 123 is displayed to indicate either the number of copies before the determining process (being increased) or the number of copies determined by the operation determining section 114 (step S112). The user is able to avoid the situation where he/she mistakenly designates an undesirable numerical value as the number of copies, by checking the numerical value 123 displayed on the screen, as necessary.

Returning to the description of FIG. 4B, the instructing section 115 generates an image forming instruction to form an image of the document designated in the notification from the target determining section 110, as many times as the number of copies indicated in the notification from the operation determining section 114. The instructing section 115 transmits the generated image forming instruction to the MFP 20 indicated in the notification from the operation determining section 114, via the communication controlling section 13 (step S113). The MFP 20 performs the image forming process based on the received image forming instruction.

5. Summary

According to the present embodiment, the posture determining section 111 determines the posture of the mobile information terminal 10 observed when the operation is performed by the user. The operation determining section 114 variably selects and determines one MFP 20 from among the plurality of image forming apparatuses as the destination to which the image forming instruction is to be transmitted, the selection varying depending on the posture of the mobile information terminal 10.

With this configuration, the user is able to select the desirable MFP 20 by changing the posture of the information processing apparatus observed when the user performs the operation. In other words, the user is able to select the MFP 20 intuitively and easily. As a result, the user is able to output the image forming instruction to the MFP 20 by performing the simple and intuitive operation.

According to the present embodiment, the selecting section 113 selects the MFPs 20 serving as the candidates for the destination to which the image forming instruction is to be transmitted, based on the orientation of the mobile information terminal 10 and the distances from the mobile information terminal 10 to the MFPs 20 (step S103).

With this arrangement, only such MFPs 20 that have a higher possibility of being selected by the user as the destination to which the image forming instruction is to be transmitted are selected as the candidates for the destination to which the image forming instruction is to be transmitted. In other words, such MFPs 20 (e.g., an MFP 20 positioned behind the user holding the mobile information terminal 10 or the like) that have a lower possibility of being selected by the user as the destination to which the image forming instruction is to be transmitted are excluded from the candidates for the destination to which the image forming instruction is to be transmitted. As a result, the number of icons displayed on the screen 12a is decreased so as to make what is displayed on the screen 12a simpler. As a result, it is possible to reduce operation errors that may occur on the touch panel.

According to the present embodiment, when the angle of elevation of the mobile information terminal 10 observed when the flick operation is performed is equal to or larger than the threshold value (i.e., when the posture of the mobile information terminal 10 is closer to the vertical angle), the operation determining section 114 determines the MFP 20 positioned closer as the destination to which the image forming instruction is to be transmitted. On the contrary, when the angle of elevation of the mobile information terminal 10 observed when the flick operation is performed is smaller than the threshold value (i.e., when the posture of the mobile information terminal 10 is closer to a horizontal line), the operation determining section 114 determines the MFP 20 positioned more distant as the destination to which the image forming instruction is to be transmitted (steps S108, S110, and S111).

With these arrangements, the user is able to select the desirable MFP 20 by changing the angle of elevation of the mobile information terminal 10 observed when the flick operation is performed. Consequently, the user is able to select the MFP 20 intuitively and easily.

According to the present embodiment, the operation determining section 114 increases the image formation number (the number of copies) every time the specific period of time has elapsed since the flick operation is finished while the mobile information terminal 10 is keeping the same posture as the posture observed when the flick operation was performed (steps S202 to S204).

With this arrangement, even when the number of copies desired by the user is particularly large, it is possible to reduce operation errors that may occur on the touch panel. In addition, it is possible to lower the possibility of the user feeling that his/her fingers getting tired and to allow the user to perform the operation intuitively.

6. Modification Examples 6-1. Modification Example 1

In the embodiment described above, the operation determining section 114 judges whether two or more icons representing MFPs 20 are displayed on the screen 12a in the direction of the flick operation (step S107) and subsequently determines the MFP 20 serving as the destination to which the image forming instruction is to be transmitted (steps S110 and S111), based on the angle of elevation of the mobile information terminal 10 observed when the flick operation is performed (step S108).

Alternatively, the operation determining section 114 may determine the MFP 20 serving as the destination to which the image forming instruction is to be transmitted (steps S110 and S111), based on only the angle of elevation of the mobile information terminal 10 observed when the flick operation is performed (step S108), without judging whether two or more icons representing MFPs 20 are displayed on the screen 12a in the direction of the flick operation (by omitting step S107).

With this arrangement, the parameter used for selecting the MFP 20 serving as the destination to which the image forming instruction is to be transmitted is only the angle of elevation of the mobile information terminal 10 observed when the flick operation is performed. (In other words, the direction of the flick operation is excluded from the parameters used for selecting the MFP 20). As a result, the user is no longer required to look at the screen 12a when selecting the MFP 20. In addition, even when the actual positional relationship among the MFPs 20 is slightly different from the positional relationship among the icons displayed on the screen 12a, the user is able to select the MFP 20 accurately.

6-2. Modification Example 2

In the embodiment described above, the selecting section 113 selects the two MFPs 20 serving as the candidates for the destination to which the image forming instruction is to be transmitted, based on the orientation of the mobile information terminal 10 and the distances from the mobile information terminal 10 (step S103: Yes; and step S105).

Alternatively, it is acceptable to cause the display circuit 12 to display all the MFPs 20 that are present within a specific distance range (three or more MFPs 20) without narrowing the MFPs 20 serving as the candidates down to two MFPs (by omitting step S103). In that situation, when the angle of elevation of the mobile information terminal 10 observed when the flick operation is performed is equal to or larger than the threshold value (step S108: Yes), the operation determining section 114 is able to determine the MFP 20 positioned closest as the destination to which the image forming instruction is transmitted (step S110). In contrast, when the angle of elevation of the mobile information terminal 10 observed when the flick operation is performed is smaller than the threshold value (step S108: No), the operation determining section 114 is able to determine the MFP 20 that is positioned second closest as the destination to which the image forming instruction is to be transmitted (step S111). In that situation, the icons representing the MFPs 20 selected at step S103 as the candidates for the destination to which the image forming instruction is to be transmitted are subject to the judging process at step S107. In this situation, when the angle of elevation of the mobile information terminal 10 observed when the flick operation is performed is smaller than the threshold value (step S108: No), the operation determining section 114 may determine the MFP 20 positioned most distant as the destination to which the image forming instruction is to be transmitted (step S111).

With this arrangement, only the two MFPs 20 that are positioned closer to the mobile information terminal 10 (and that have a higher possibility of being selected by the user as the destination to which the image forming instruction is to be transmitted) are substantially treated as the candidates. Consequently, even when icons representing three or more MFPs 20 are displayed on the screen 12a so that the screen 12a looks complicated, the user is able to easily select the desirable MFP 20. As a result, it is possible to reduce operation errors that may occur on the touch panel.

7. Others

The present disclosure may also be configured as described below:

(1) An information processing method comprising:
detecting an operation performed by a user:
determining a posture of an information processing apparatus observed when the operation is performed; and
variably selecting and determining one of image forming apparatuses as a destination to which an image forming instruction is to be transmitted, the selection varying depending on the posture of the information processing apparatus observed when the operation is performed.

(2) A non-transitory computer-readable storage medium storing therein an information processing program that causes an information processing apparatus to function as:
an operating section that detects an operation performed by a user;
a posture determining section that determines a posture of the information processing apparatus observed when the operation is performed; and
an operation determining section that variably selects and determines one of image forming apparatuses as a destination to which an image forming instruction is to be transmitted, the selection varying depending on the posture of the information processing apparatus observed when the operation is performed.

What is claimed is:

1. An information processing apparatus, comprising:
a processor;
a memory storing therein an information processing program; and
a sensor that detects a posture of the information processing apparatus, wherein
when the processor executes the information processing program, the processor operates to:
detect a flick operation performed by a user;
determine a flick receiving posture of the information processing apparatus detected by the sensor when the flick operation is performed;
determine one of a plurality of image forming apparatuses to be selected as a destination to which an image forming instruction is to be transmitted, the image forming apparatus to be selected varying depending on the flick receiving posture of the information processing apparatus; and
determine an image formation number on a basis of a time period from time at which the information processing apparatus is determined as being in the flick receiving posture to time at which the information processing apparatus is determined as not being in the flick receiving posture such that the image formation number is increased every time a specific period of time has elapsed as long as the information processing apparatus keeps a same posture as the flick receiving posture since the flick operation is performed.

2. The information processing apparatus according to claim 1, wherein
when the processor executes the information processing program, the processor further operates to select one or more of the plurality of image forming apparatuses as candidates for the destination to which the image forming instruction is to be transmitted, on a basis of an orientation of the information processing apparatus and distances from the information processing apparatus.

3. The information processing apparatus according to claim 2, wherein when the processor executes the information processing program, the processor further operates to select the one or more of the plurality of image forming apparatuses that are present within a specific angle range on a horizontal plane centered on a half-line starting from the information processing apparatus and indicating the orientation of the information processing apparatus, as the candidates for the destination to which the image forming instruction is to be transmitted.

4. The information processing apparatus according to claim 2, wherein when the processor executes the information processing program, the processor further operates to select the one or more of the plurality of image forming apparatuses that are present within a specific distance range from the information processing apparatus, as the candidates for the destination to which the image forming instruction is to be transmitted.

5. The information processing apparatus according to claim 2, wherein when the processor executes the information processing program, the processor further operates to determine an elevation angle of the information processing apparatus with respect to a horizontal plane detected by the sensor when the flick operation is performed, when the processor executes the information processing program, the processor further operates to select three or more image forming apparatuses as the one or more of the plurality of image forming apparatuses, when the elevation angle is equal to or larger than a threshold value and equal to or smaller than an angle indicating verticality, the processor operates to determine one of the three or more image forming apparatuses that is positioned closest to the information processing apparatus as the destination to which the image forming instruction is to be transmitted, and when the elevation angle is smaller than the threshold value and equal to or larger than an angle indicating horizontality, the processor operates to determine one of the three or more image forming apparatuses that is positioned second closest to the information processing apparatus as the destination to which the image forming instruction is to be transmitted.

6. The information processing apparatus according to claim 2, wherein when the processor executes the information processing program, the processor further operates to determine an elevation angle of the information processing apparatus with respect to a horizontal plane detected by the sensor when the flick operation is performed, when the processor executes the information processing program, the processor further operates to select two image forming apparatuses as the one or more of the plurality of image forming apparatuses, when the elevation angle is equal to or larger than a threshold value and equal to or smaller than an angle indicating verticality, the processor operates to determine one of the two image forming apparatuses that is positioned closer to the information processing apparatus than the other image forming apparatus as the destination to which the image forming instruction is to be transmitted, and when the elevation angle is smaller than the threshold value and equal to or larger than an angle indicating horizontality, the processor operates to determine one of the two image forming apparatuses that is positioned more distant from the information processing apparatus than the other image forming apparatus as the destination to which the image forming instruction is to be transmitted.

7. The information processing apparatus according to claim 6, wherein when the processor executes the information processing program, the processor further operates to select, when the one or more of the plurality of image forming apparatuses are two or more image forming apparatuses, two image forming apparatuses that are positioned closer to the information processing apparatus among the two or more image forming apparatuses, as the candidates for the destination to which the image forming instruction is to be transmitted.

8. The information processing apparatus according to claim 1, further comprising:

a storage circuit that has a storage area and has stored therein document data representing a document; and a display circuit that displays a document icon representing the document and one or more apparatus icons representing one or more of the plurality of image forming apparatuses serving as candidates for the destination to which the image forming instruction corresponding to the document data is to be transmitted, wherein when the processor executes the information processing program, the processor further operates to:

select the one or more of the plurality of image forming apparatuses on a basis of an orientation of the information processing apparatus and distances from the information processing apparatus; and determine the one of the plurality of image forming apparatuses serving as the destination to which the image forming instruction is to be transmitted, from among the one or more of the plurality of image forming apparatuses serving as the candidates, on a basis of the flick operation performed by the user, positional arrangements of the apparatus icons, and the flick receiving posture of the information processing apparatus.

9. The information processing apparatus according to claim 1, further comprising:

a display circuit that displays the increased image formation number, every time the processor increases the image formation number.

10. The information processing apparatus according to claim 1, wherein the flick receiving posture is an elevation angle of the information processing apparatus with respect to a horizontal plane detected by the sensor when the flick operation is performed.

11. A non-transitory computer-readable storage medium storing therein an information processing program to be executed by a computer of an information processing apparatus, wherein the information processing program comprises:

a first program code that causes the computer to detect a flick operation performed by a user;

a second program code that causes the computer to determine a flick receiving posture of the information processing apparatus detected by a sensor when the flick operation is performed; and a third program code that causes the computer to determine one of a plurality of image forming apparatuses to be selected as a destination to which an image forming instruction is to be transmitted, the image forming apparatus to be selected varying depending on the flick receiving posture of the information processing apparatus, wherein the third program code further causes the computer to determine an image formation number on a basis of a time period from time at which the information processing apparatus is determined as being in the flick receiving posture to time at which the information processing apparatus is determined as not being in the flick receiving posture such that the image formation number is increased every time a specific period of time has elapsed as long as the information processing apparatus keeps a same posture as the flick receiving posture since the flick operation is performed.

12. The non-transitory computer-readable storage medium according to claim 11, wherein the flick receiving posture is an elevation angle of the information processing apparatus with respect to a horizontal plane detected by the sensor when the flick operation is performed.

13. The non-transitory computer-readable storage medium according to claim 11, wherein the third program code further causes the computer to select one or more of the plurality of image forming apparatuses as candidates for the destination to which the image forming instruction is to be transmitted, on a basis of an orientation of the information processing apparatus and distances from the information processing apparatus.

14. The non-transitory computer-readable storage medium according to claim 13, wherein the second program code further causes the computer to determine an evaluation angle of the information processing apparatus with respect to a horizontal plane detected by the sensor when the flick operation is performed, the third program code further causes the computer to select two image forming apparatuses as the one or more of the plurality of image forming apparatuses, when the elevation angle is equal to or larger than a threshold value and equal to or smaller than an angle indicating verticality, the third program code causes the computer to determine one of the two image forming apparatuses that is positioned closer to the information processing apparatus than the other image forming apparatus as the destination to which the image forming instruction is to be transmitted, and when the elevation angle is smaller than the threshold value and equal to or larger than an angle indicating horizontality, the third program code causes the computer to determine one of the two image forming apparatuses that is positioned more distant from the information processing apparatus than the other image forming apparatus as the destination to which the image forming instruction is to be transmitted.

15. The non-transitory computer-readable storage medium according to claim 14, wherein the third program code causes the computer to select, when the one or more of the plurality of image forming apparatuses are two or more image forming apparatuses, two image forming apparatuses that are positioned closer to the information processing apparatuses among the two or more image forming apparatuses, as the candidates for the destination to which the image forming instruction is to be transmitted.

16. The non-transitory computer-readable storage medium according to claim 13, wherein the second program code further causes the computer to determine an elevation angle of the information processing apparatus with respect to a horizontal plane detected by the sensor when the flick operation is performed, the third program code further causes the computer to select three or more image forming apparatuses as the one or more of the plurality of image forming apparatuses, when the elevation angle is equal to or larger than a threshold value and equal to or smaller than an angle indicating verticality, the third program code further causes the computer to determine one of the three or more image forming apparatuses that is positioned closest to the information processing apparatus as the destination to which the image forming instruction is to be transmitted, and when the elevation angle is smaller than the threshold value and equal to or larger than an angle indicating horizontality, the third program code causes the computer to determine one of the three or more image forming apparatuses that is positioned second closest to the information processing apparatus as the destination to which the image forming instruction is to be transmitted.

* * * * *